United States Patent
Mariman et al.

(10) Patent No.: US 6,672,627 B1
(45) Date of Patent: Jan. 6, 2004

(54) LIGHTWEIGHT AIR COUPLER

(75) Inventors: Nathan Albert Mariman, Geneseo, IL (US); Dan Michael Deering, Moline, IL (US); Daniel Bruce Thiemke, Des Moines, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/783,651

(22) Filed: Feb. 14, 2001

(51) Int. Cl.$^7$ ............................................... F16L 39/00
(52) U.S. Cl. .......................... 285/124.1; 285/124.3; 285/202; 285/293.1; 285/363; 285/282; 29/527.5
(58) Field of Search ................ 285/124.1, 124.3, 285/405, 363, 293.1, 382, 222, 202, 141.1; 29/527.5

(56) References Cited

U.S. PATENT DOCUMENTS

| | | | | |
|---|---|---|---|---|
| 2,209,974 A | * | 8/1940 | Jacobus | 285/56 |
| 2,209,975 A | * | 8/1940 | Jacobus | 285/56 |
| 2,786,417 A | * | 3/1957 | Lung | 285/124.1 |
| 3,092,845 A | * | 6/1963 | Mustee | 4/696 |
| 3,216,749 A | * | 11/1965 | Summerfield | 285/137 |
| 3,471,178 A | * | 10/1969 | Roe | 285/137 |
| 3,621,877 A | * | 11/1971 | Hickmann | 137/595 |
| 3,708,867 A | * | 1/1973 | Meserole | 29/525 |
| 3,758,139 A | * | 9/1973 | Meserole | 285/332 |
| 3,762,059 A | * | 10/1973 | Dawson | 33/174 |
| 3,774,944 A | * | 11/1973 | Slaton | 285/124.5 |
| 4,145,068 A | * | 3/1979 | Toyomasu et al. | 280/281 R |
| 4,321,911 A | * | 3/1982 | Offutt | 126/448 |
| 4,529,104 A | * | 7/1985 | Tyler | 222/146.2 |
| 4,569,486 A | * | 2/1986 | Balmer | 239/655 |
| 4,642,864 A | * | 2/1987 | Metcalfe et al. | 29/157.3 R |
| 4,793,742 A | * | 12/1988 | Strand | 406/79 |
| 4,793,743 A | * | 12/1988 | Grodecki et al. | 406/123 |
| 4,834,004 A | * | 5/1989 | Butuk et al. | 111/200 |
| 4,923,222 A | * | 5/1990 | Deshazer et al. | 285/137.1 |
| 5,078,432 A | * | 1/1992 | Seiter | 285/137.1 |
| 5,125,583 A | * | 6/1992 | Strand | 239/655 |
| 5,219,185 A | * | 6/1993 | Oddenino | 285/26 |
| 5,224,740 A | * | 7/1993 | Smith | 285/38 |
| 5,297,820 A | * | 3/1994 | Martin | 285/137.1 |
| 5,429,397 A | * | 7/1995 | Kanao | 285/288 |
| 5,437,481 A | * | 8/1995 | Spears et al. | 285/174 |
| 5,478,119 A | * | 12/1995 | Dye | 285/26 |
| 5,490,560 A | * | 2/1996 | Helms et al. | 165/173 |
| 5,507,528 A | * | 4/1996 | Mastrosimone | 285/22 |
| 5,636,878 A | * | 6/1997 | Millward et al. | 285/55 |
| 5,655,468 A | * | 8/1997 | Ledermann et al. | 111/164 |
| 5,735,554 A | * | 4/1998 | Imgam | 285/239 |
| 5,791,870 A | * | 8/1998 | Alexander | 415/119 |
| 5,865,474 A | * | 2/1999 | Takahashi | 285/124.1 |
| 5,915,312 A | * | 6/1999 | Meyer et al. | 111/174 |
| 5,947,040 A | | 9/1999 | Gregor | 111/174 |
| 5,979,343 A | | 11/1999 | Gregor et al. | 111/175 |
| 6,010,327 A | * | 1/2000 | Katchka | 431/75 |
| 6,070,659 A | * | 6/2000 | Hosoya | 165/178 |
| 6,131,964 A | * | 10/2000 | Sareshwala | 285/382 |
| 6,254,142 B1 | * | 7/2001 | Kaifel et al. | 285/124.1 |
| 6,443,498 B1 | * | 9/2002 | Liao | 285/124.1 |
| 6,523,861 B1 | * | 2/2003 | Clancy et al. | 285/93 |
| 2001/0019207 A1 | * | 9/2001 | Billmyer et al. | 285/124.1 |

FOREIGN PATENT DOCUMENTS

DE 2025039 * 12/1971

* cited by examiner

*Primary Examiner*—William L. Miller
*Assistant Examiner*—Carlos Lugo

(57) ABSTRACT

A lightweight detachable air coupler for an air seeder comprises an aluminum frame having two steel sleeves die cast into the frame. The frame is provided with two circular apertures each being defined by a rim having an internal cylindrical surface. The steel cylindrical sleeve has a first end having an exterior surface that is diagonally knurled. Two steel sleeves are mounted in the mold for the aluminum frame and cast aluminum is injected into the mold. The liquid aluminum adheres to the knurled exterior surface of the steel sleeves. The aluminum frame has a front surface from which the rims project and a rear surface from which the sleeves project.

1 Claim, 2 Drawing Sheets

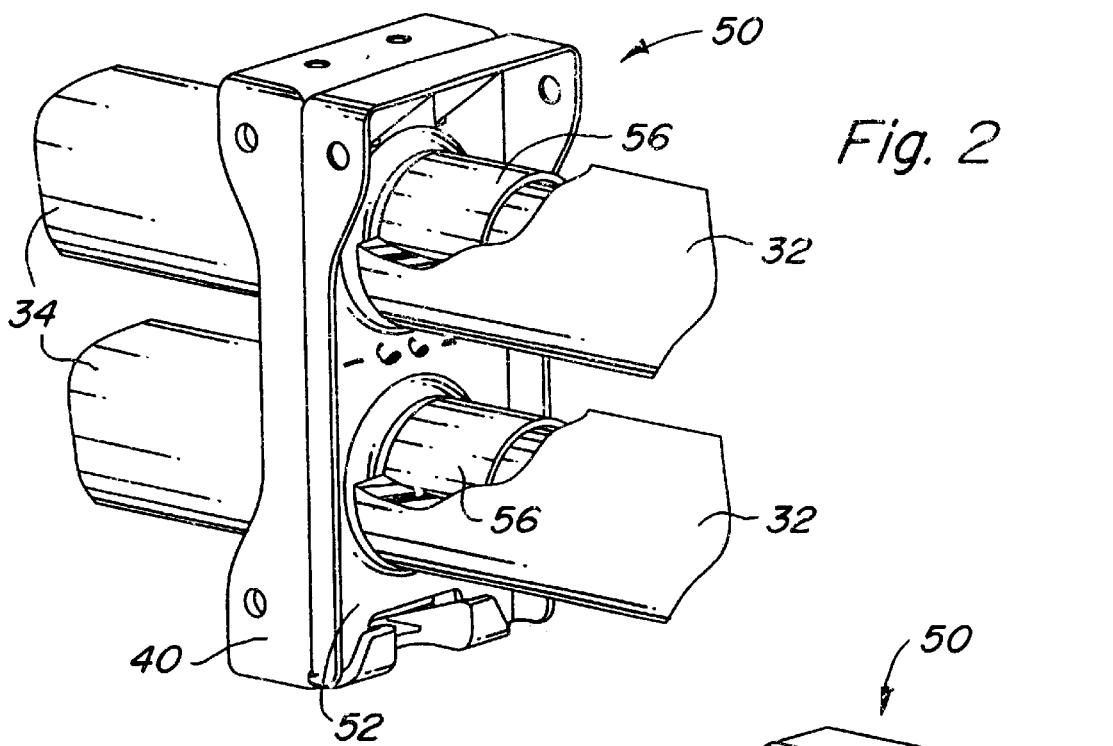
Fig. 2
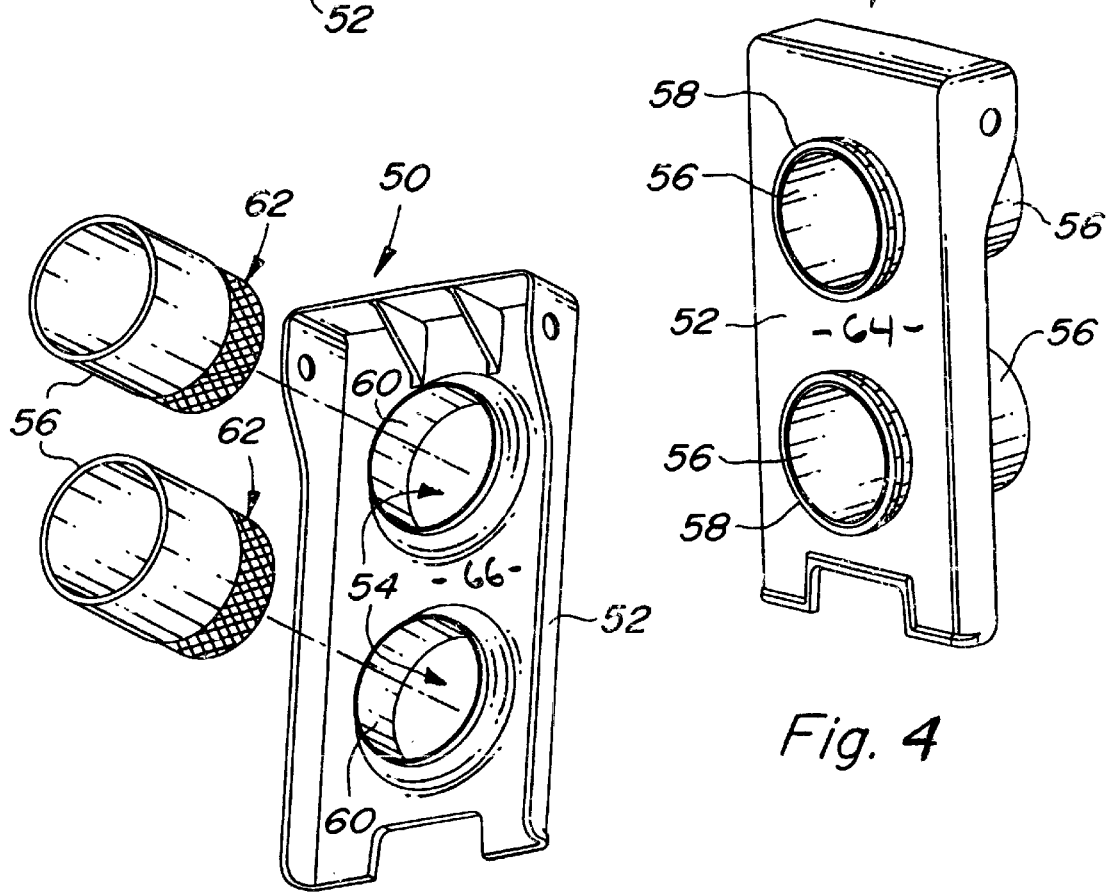
Fig 3
Fig. 4

LIGHTWEIGHT AIR COUPLER

BACKGROUND OF THE INVENTION

1. Field of the Invention

The present invention is directed to a lightweight air coupler for an air seeder comprising an aluminum frame that is die cast around steel sleeves having a knurled surface.

2. Description of the Prior Art

Air seeders are commonly towed by tractors to apply seed and/or fertilizer to a field. Typically, the air seeder is towed in combination with a tilling implement, one behind the other. The seed cart carries seed and fertilizer and directs measured amounts of these products through air lines to ground openers on the tilling implement. The ground openers place seed and fertilizer under the surface of the soil. The seed cart comprises one or more frame-mounted product tanks for holding granular product, such as seed and/or fertilizer. The seed cart is provided with a product meter located below the product tanks for dispensing metered product from the respective product tank into a pneumatic distribution system for delivering the metered product to the field. The pneumatic distribution system comprises a plurality of air lines that extend rearwardly from the product meters to secondary air distribution manifolds located on the tilling implement. Each air line comprises a seed cart air line and a tilling implement air line that are coupled to one another at a coupler. The secondary air distribution manifolds ("headers") distribute product through individual lines to seed boots mounted behind ground openers on the tilling implement.

The tilling implement is detachably coupled to the seed cart by a hitch. The air lines from the seed cart extend rearwardly to a coupler mounting on the tilling implement. The seed cart air lines are detachably mounted to the coupler. Tilling implement air lines are fixed to the coupler and extend to the secondary air distribution manifolds. That portion of the seed cart air lines adjoining the coupler typically comprise flexible tubes. Pairs of these tubes are mounted to a detachable air coupler. The detachable air coupler is mounted to a vertical standard fixedly mounted on the tilling implement. When mounted to the vertical standard the seed cart air lines are coupled to corresponding tilling implement air lines. The air couplers are held in place on the vertical standards by a mechanical latch.

Typically air couplers are made of steel. Steel air couplers and the seed cart air lines to which they are mounted are very heavy and clumsy to attach and detach from the vertical standard. Aluminum air couplers have also been used to reduce the weight of the air coupler facilitating attachment and detachment to and from the vertical standard. However, it has been found that the high speed air stream and associated seed and fertilizer can erode the aluminum air coupler at unacceptable rates.

SUMMARY

It is an object of the present invention to provide a lightweight air coupler having an aluminum frame and steel sleeves.

A lightweight detachable air coupler for an air seeder comprises an aluminum frame having two steel sleeves die cast into the frame. The frame is provided with two circular apertures each being defined by a rim having an internal cylindrical surface. The steel cylindrical sleeve has a first end having an exterior surface that is diagonally knurled. Two steel sleeves are mounted in the mold for the aluminum frame and cast aluminum is injected into the mold. The liquid aluminum adheres to the knurled exterior surface of the steel sleeves. The aluminum frame has a front surface from which the rims project and a rear surface from which the sleeves project.

BRIEF DESCRIPTION OF THE DRAWINGS

FIG. 2 is a partial cutaway perspective view of the air coupler of the present invention mounted to a vertical standard.

FIG. 3 is an exploded rear view of the air coupler.

FIG. 4 is a perspective front view of the air coupler.

DETAILED DESCRIPTION

Figure 1:
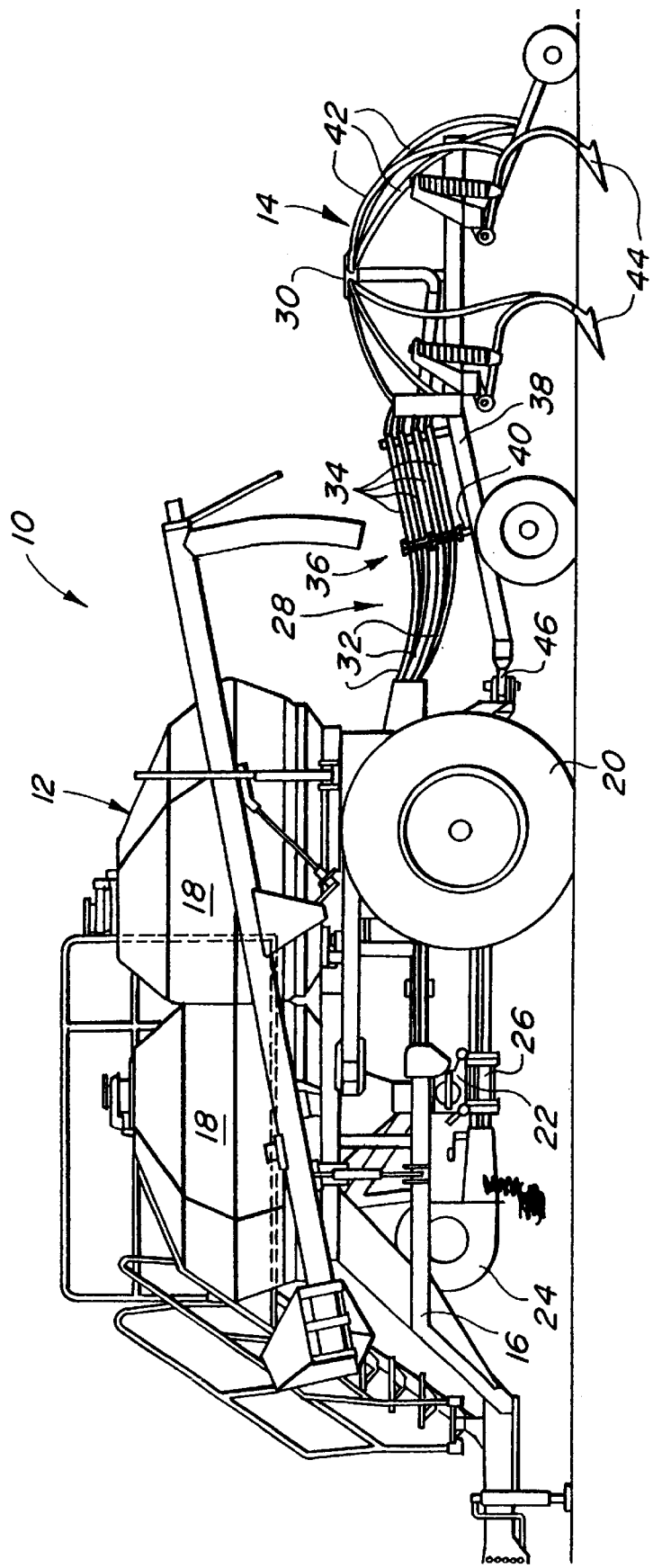
FIG. 1 is a side view of an air seeder.

As shown in FIG. 1, air seeder 10 comprises a seed cart 12 and a tilling implement 14. The seed cart 12 is typically towed by a tractor through a field to be seeded. The seed cart 12 has a frame 16 supporting front and rear product tanks 18. Wheels 20 are rotatably mounted to the frame 16. Both product tanks 18 are provided with product meters 22 and primary distribution manifolds 26. Both product meters 22 are located below the product tanks 18 and receive product therefrom for controlled feeding of product into a pneumatic distribution system. The primary distribution manifolds 26 are located below the product meters 22. Both primary distribution manifolds 26 are part of the pneumatic distribution system. The pneumatic air distribution system is provided with a blower 24 for directing an air stream through the system. The pneumatic air distribution system is also provided with a plurality of rearwardly extending air lines 28 which extend from the primary distribution manifolds 26 to the secondary distribution manifolds 30 located on the tilling implement 14. The air lines 28 have a plurality of seed cart air lines 32 and tilling implement air lines 34 that are detachably coupled to one another at coupler 36.

The coupler 36 is mounted to the frame 38 of the tilling implement 14. The coupler 36 comprises a vertical standard 40 to which the tilling implement air lines 34 are fixedly attached. Metered product passing through the seed cart air lines 32 to the tilling implement air lines 34 is directed to the secondary distribution manifold 30. The secondary distribution manifold 30 directs the metered seed through individual lines 42 to ground openers 44. The frame 38 of the tilling implement 14 is detachably mounted to the seed cart 12 by hitch 46. The seed cart air lines 32 are detachably coupled to the tiling implement 14 by coupler 36.

The seed cart air lines 32 are flexible and are mounted in vertical pairs to an air coupler 50. The upper seed cart line representing the top rank of air lines fed metered product from one of the product tanks 18, and the bottom seed cart air line representing the bottom rank of air lines fed metered product from the other product tank 18.

The air coupler 50 comprises an aluminum frame 52 having two circular apertures 54 into which steel cylindrical sleeves 56 are mounted. Each circular apertures 54 is defined by a rim 58 having an internal surface 60. Each of the steel sleeves 56 have a first end having an exterior surface that is diagonally knurled 62. The steel sleeves 56 are die cast in place with the aluminum frame 52.

The aluminum frame 52 has a front surface 64 and a rear surface 66. The rims 58 extend outwardly from the front surface 64. The steel sleeves 56 extend outwardly from the rear surface 66. The front surface 64 is mounted against the vertical standard 40 by a releasable latching structure, not shown.

The air coupler 50 is made by first forming two steel cylindrical sleeves 56 and knurling the exterior surface adjacent the first end. The sleeves 56 are then placed in a mold for the aluminum frame 52. Cast aluminum is then injected into the mold. The cast aluminum engages the knurled exterior surface of the steel sleeves 56.

The present invention should not be limited by the above-described embodiment, but should be limited solely by the claims that follow:

We claim:

1. A method of making an air coupler for an air seeder, the method comprising the following steps:

forming a cylindrical steel sleeve having an exterior surface and a first end;

knurling the exterior surface of the steel sleeve at the first end;

placing the cylindrical steel sleeve in a mold for an aluminum frame having a rim with an internal surface;

molding the aluminum frame so that the internal surface of the rim is cast around the knurled exterior surface of the steel sleeve.

* * * * *